(12) United States Patent
Grosser et al.

(10) Patent No.: US 6,182,173 B1
(45) Date of Patent: Jan. 30, 2001

(54) HOT PLUG ADAPTERS USING OPTICAL SWITCHES

(75) Inventors: Cynthia M. Grosser, Raleigh; Susan P. Wise, Chapel Hill; Michael Sven Miller, Raleigh; Brian Alan Trumbo, Cary; Michael J. Huck, Apex, all of NC (US); Steven E. Howell, Brentwood, TN (US); Courtney Long, Chapel Hill, NC (US); Andrew Stern Heinzmann, Holly Springs, NC (US); Richard P. Southers, Durham, NC (US)

(73) Assignee: International Business Machines Corporation, Armonk, NY (US)

( * ) Notice: Under 35 U.S.C. 154(b), the term of this patent shall be extended for 0 days.

(21) Appl. No.: 08/969,885

(22) Filed: Nov. 14, 1997

(51) Int. Cl.[7] ....................................................... G06F 13/00
(52) U.S. Cl. ............................ 710/103; 710/102; 361/58; 363/21
(58) Field of Search ..................................... 395/281–283, 395/750.01, 750.07, 750.08; 235/492; 361/58; 363/21; 307/147

(56) References Cited

U.S. PATENT DOCUMENTS

| | | | | |
|---|---|---|---|---|
| 5,310,998 | * | 5/1994 | Okuno ................................... | 235/380 |
| 5,386,567 | * | 1/1995 | Lien et al. ............................ | 710/103 |
| 5,530,302 | * | 6/1996 | Hamre et al. ......................... | 307/147 |
| 5,625,238 | * | 4/1997 | Ady et al. ............................. | 307/147 |
| 5,640,312 | * | 6/1997 | Carroll ..................................... | 363/21 |
| 5,712,754 | * | 1/1998 | Sides et al. ............................. | 361/58 |
| 5,748,912 | * | 5/1998 | Lee ....................................... | 395/282 |
| 5,802,328 | * | 9/1998 | Yoshimura ........................... | 395/282 |
| 5,822,196 | * | 10/1998 | Hastings et al. ..................... | 361/801 |
| 5,875,308 | * | 2/1999 | Egan et al. ........................... | 395/283 |
| 5,922,060 | * | 7/1999 | Goodrum ............................. | 710/103 |

* cited by examiner

Primary Examiner—Ayaz R. Sheikh
Assistant Examiner—Raymond N Phan
(74) Attorney, Agent, or Firm—Martin J. McKinley

(57) ABSTRACT

A computer has at least one adapter card slot for receiving an optional adapter card. A cover plate is rotatable hinged and has open and closed positions. In the closed position, the cover plate covers the adapter card slot and inhibits the insertion or removal of an adapter card. When the cover plate is raised into the open position, a tab on the back of the cover plate is rotated out of the slot of an optical switch, and the optical switch then signals circuitry to remove power and bus signals from the adapter card slot; thereby permitting the adapter card to be removed from or inserted into the slot without removing power to the entire computer. When the cover plate is returned to the closed position, the tab is reinserted into the slot of the optical switch, which in turn signals the circuitry to return power and bus signals to the adapter card slot. A locking tab firmly clamps the adapter card bracket to the housing bracket; thereby providing a good ground connection from the adapter card to the computer housing.

3 Claims, 8 Drawing Sheets

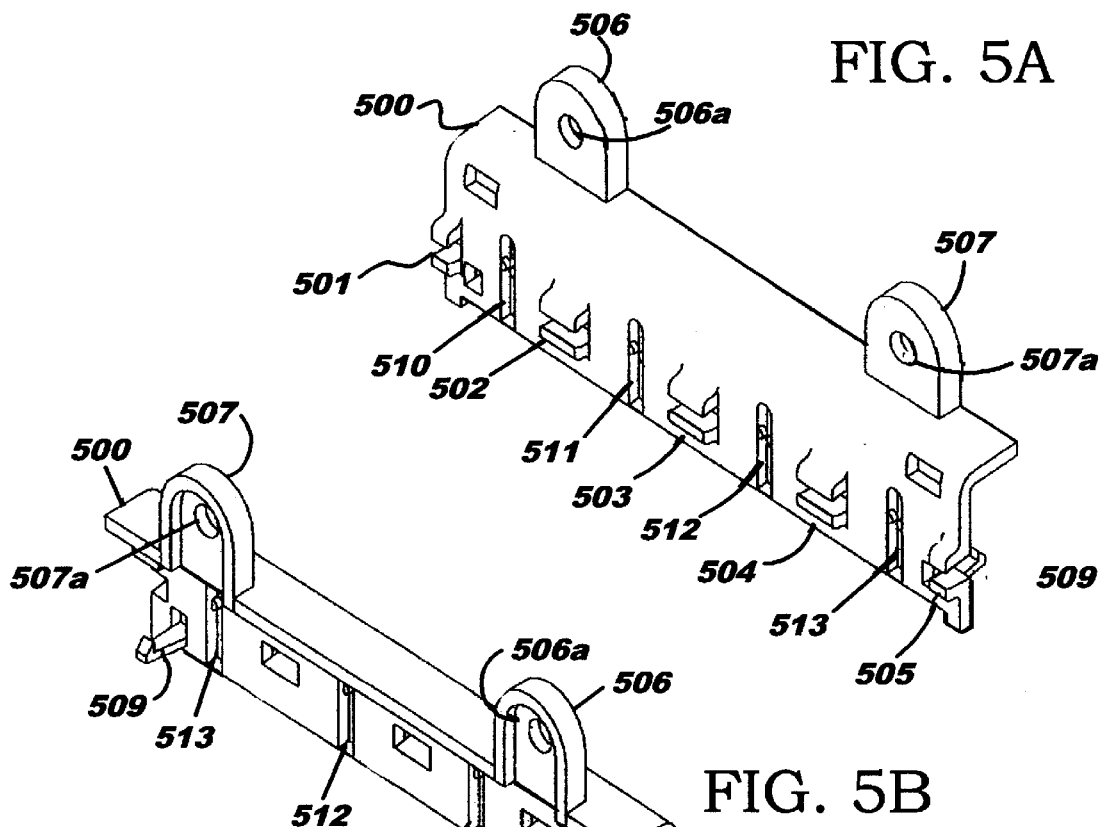
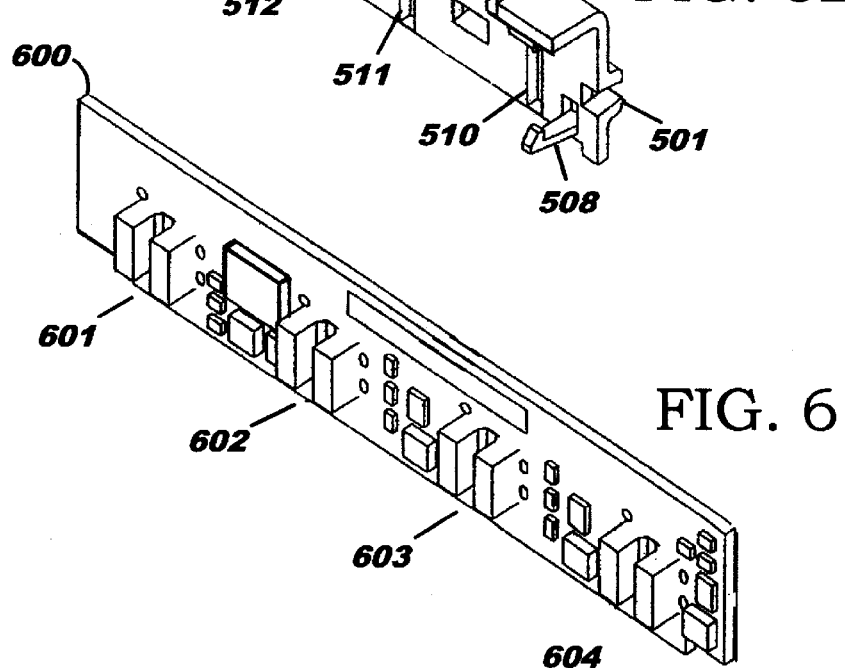

HOT PLUG ADAPTERS USING OPTICAL SWITCHES

FIELD OF THE INVENTION

This invention pertains to computers and other information processing apparatus that use pluggable option or adapter cards and, more particularly, to a system employing a hinged and rotatable cover plate and optical switch assembly that allows adapter cards to be "hot plugged" into the computer without turning the power off to the computer.

BACKGROUND OF THE INVENTION

Because of increasing dependency on electrical machines in general, and processor-based machines in particular, there is a need for processor-based machines (hereafter called computers) which can be serviced while performing regular functions. A typical computer includes a motherboard and/or backplane with a plurality of slots. The slots are the receptacles for adapters or cards which can be used to expand the capacity and functionality of the computer. Occasionally, adapters become defective and have to be replaced. To provide uninterrupted service, the computer has to be fully operational during removal or insertion of the adapters. In addition, the removal and/or insertion must not have deleterious results on the computer operations.

A technique termed "hot plugging", "hot swap", or variations thereof enables the insertion and/or removal of adapters while the computer is operational. Even though hot plugging is a desirable goal, if not done properly, it can cause problems which over time adversely affect the operability of the computer system. A likely problem is pitting of the metal used on the connecting pins located on the adapter and the connector. A main cause of pitting is believed to be electrical arcing which occurs at the electrical contacts while interconnection is made or broken. Another problem is electrical noise which can adversely affect the performance of the system. The cause of this noise is believed to be the large change in current over a short period of time (di/dt) at the instance when the connection is made between power pins on the card and the socket. This problem is particularly severe when hot-plugging an adapter card with a large amount of decoupling capacitance. Finally, the large surge of current is likely to cause voltage transients onto the computer system backplane. The voltage transients can cause loss of data, incorrect program execution and, in severe situations, damage to delicate hardware components.

The prior art has recognized the need for precautions and have provided system and method which go a long way to minimize some of the problems. The populous prior art solution is the use of "staggered-pins" to sequence power and signals from the host system to the card being hot plugged. In some implementation, additional electrical circuits are used to charge the card capacitance in a controlled way. The "staggered pins" means that the lengths of the pins making the interconnection varies. Usually, the power carrying pins are longer than the signal carrying ones. Consequently, when the card is inserted into the connector, power is established before signaling. Likewise, when the card is removed, the signal pins are disconnected prior to the power pins. One of the problems with this populous solution is that connectors with special pins are required. Another problem is that staggered pins necessitate the use of proprietary adapter design. The cost associated with fabricating and manufacturing connectors with special pins unnecessarily increases the price of the Box. As used in this document, "Box" refers to the system in which the card is plugged.

Another problem with the "staggered pins" arrangement is that the connect/disconnect time is sometimes too short for the system to perform an orderly logical shut down and/or "bring-up" of the adapter. The connect/disconnect time covers the time delay for the long/short power/signal pins on the card to contact/disconnect the power/signal pins on the system to which the adapter is inserted. Usually, the connect/disconnect times, for the "staggered-pins" arrangement, are in the order of milliseconds. Longer times are required for adequate shutdown and/or bring-up of complex adapters. This time may grow even longer as more functions are placed on the adapter.

Consequently, there is a need for a hot-plug system that affords sufficient time to shut down and/or bring-up the functions on the adapter before the adapter is inserted or removed from the system.

A less populous but effective solution uses electrical circuits and switches for coupling the card's power and signal busses to the system's power and signal busses. U.S. Pat. No. 5,473,499, "Hot Pluggable Motherboard Bus Connection Method", by Steven Weir, is an example of the solution. Even though the patent teachings are in the right direction, because the pins in the connector are of the same length rather than staggered, it too has drawbacks which the below invention solves.

One of the drawbacks is that the patent requires a predetermined time delay between connection of the power busses and the signal busses. The predetermined time delay enables the voltages on the card to be stabilized before the signal busses are connected. It appears as if operator's intervention is required to set the predetermined time which may be different for different systems and even in the same system, may have to change as components age. Due to the likelihood of human error, there is a need to provide a fully automated system which does not require human intervention, other than to insert/remove the card.

SUMMARY OF THE INVENTION

It is a general object of the invention to provide a more efficient and effective hot plug system than was heretofore been available.

It is another object of the invention to provide a fully automated hot plug system which does not require human intervention other than to insert or remove the card from the system.

It is still another object of the present invention to provide a hot plug system that allows the card to be removed without damaging card components.

It is yet another object of the present invention to allow industry standard adapters (such as PCI) to be used in the system without major changes to circuitry on the adapter.

Briefly the invention is a system for removing and attaching an adapter card to a computer bus while power is applied to the computer. The computer system has an adapter card slot for receiving the adapter card and a bus for electrically coupling the adapter card to the bus. The bus carries power and bus signals to the adapter card. The system includes an optical switch and means, coupled to said optical switch, for disconnecting and connecting power and bus signals to the adapter card slot. A rotatable cover plate has open and closed positions wherein, in the closed position, the cover plate covers the adapter card slot physically preventing the adapter card from being inserted into slot. The rotatable cover plate includes a tab, and the tab is inserted into an opening in the optical switch such that power and bus signals are connected to the adapter card slot when the cover plate is in the closed position. The tab is removed from the opening in said optical switch when the cover plate is rotated into the open position such that power and bus signals are removed from the adapter card slot when the cover plate is in the open position.

These and other features of the invention and advantages will be more clearly understood from the drawings and description of a preferred embodiment.

BRIEF DESCRIPTION OF THE DRAWINGS

FIGS. 5A and 5B are, respectively, front and rear perspective views of the cover plate base.

FIG. 6 is a perspective view of the PC board that mounts to the cover plate base and includes the optical switches.

DETAILED DESCRIPTION OF THE PREFERRED EMBODIMENT

Figure 1:
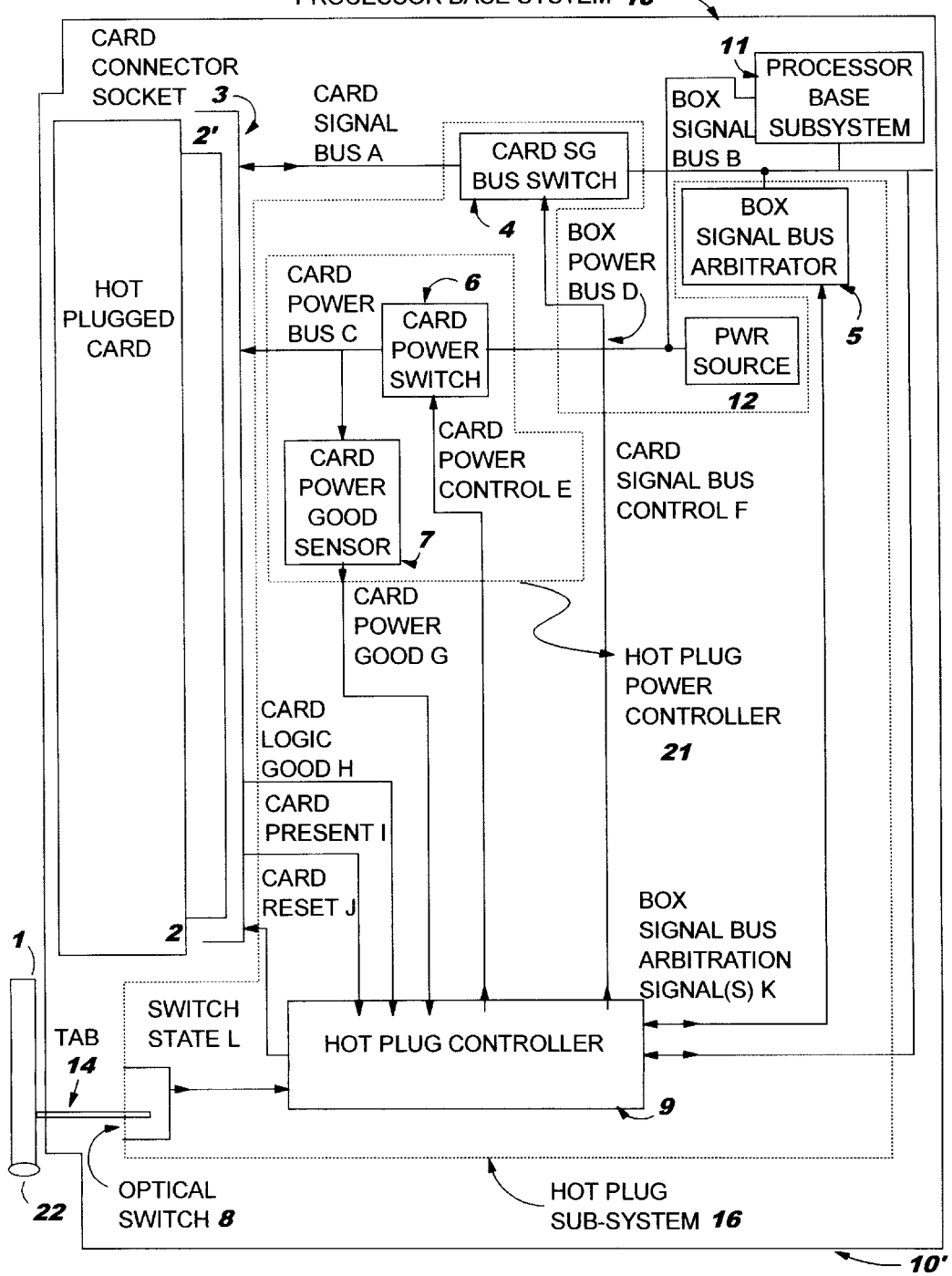
FIG. 1 illustrates a processor-based system according to the teachings of the present invention.

FIG. 1 shows a functional representation of the Processor Base System 10 according to the teachings of the present invention. The Processor Base System 10 may be a personal computer (PC), workstation or any machine using a microprocessor or other processor as a controller. Included in this group would be network servers, hubs, routers, PC's or similar machines. The Processor Base System 10 includes Processor Base Subsystem 11, Power Supply 12, Card Connector Socket 3, cover plate 1, Hot Plugged Card 2, and Hot Plugged Sub-System 16. The Hot Plugged Card 2 is a circuit card on which a plurality of electronic components are placed for performing desired functions. Such cards are widely known in the prior art and a detailed description will not be given. It should be noted that Card 2 has Connector Section 2' which has a plurality of electrical contacts for coacting with similar contacts when the card is inserted in Card Connector Socket 3. The electrical contacts of the Connector Section 2' can be electrical pins or card edge tabs. It should be noted that the electrical contacts on Connector 2' may all be the same length as opposed to the prior art which uses different lengths.

Still referring to FIG. 1, the Processor Base System 10 further includes a Housing 10' to which the cover plate 1 is rotatably connected. For purposes of description, the Processor Base System 10 will be referred hereinafter as Box 10. A Switching Device 8 is mounted to Housing 10'. A cover plate Tab 14 is connected to the cover plate and is positioned so as to activate the Switch Device 8. In the preferred embodiment of this invention, the Switch Device 8 is an optical switch and the cover plate Tab 14 is a relatively flat piece of material which, when withdrawn or inserted between the light emitting and light receiving elements of the optical switch, creates a change in condition so that a level charge is generated on the conductor labeled Switch State L.

Still referring to FIG. 1, Processor Base Subsystem 11 represents the portion of the Processor Base System 10 that is programmed to perform desired functions. Depending on the type of Box 10, the components in Processor Base Subsystem 11 will be different. However, regardless of the type of box, it will contain a processor (Central Processing Unit, CPU) having an operating system software, program drivers, storage, memory, etc. Stated another way, all that is necessary to make a microprocessor base system operational is represented by Processor Base Subsystem 11. In addition, Power Source 12 provides the power for the Box 10. Power Bus D is connected to Power Source 12 and provides the power for the box.

Likewise, Box Signal Bus B is the processor signal bus and provides signals for the box. The signal bus includes data, address, clock and control signals. The Hot Plug Sub-System 16 electronically couples the Card Signal Bus A to the Box Signal Bus B and the Card Power Bus C to the Box Power Bus D. The Card Signal Bus A and the Card Power Bus C terminate on appropriate pins positioned within Card Connector Socket 3.

When the Card 2 is plugged into the Socket 3 or removed from the Socket 3, the Controller 9 makes sure that even though the box is in full operational mode, the insertion or removal does not cause a deleterious effect on the box. For purposes of discussion, the signal bus is shown as two sections: namely, Box Signal Bus B and Card Signal Bus A. The Box Signal Bus B is coupled to Processor Base Subsystem 11 while Card Signal Bus A is coupled to Card Connector Socket 3. A similar structure is assigned to the power bus. In particular, the Box Power Bus D is connected to the Power Source 12 and the Card Power Bus C is connected to the Card Socket 3. The Hot Plug Sub-System 16 includes Card Signal Bus Switch 4 coupled between the Box Signal Bus B and the Card Signal Bus A. The Card Bus Switch 4 provides the means of connecting and disconnecting the Card Signal Bus A to the Box Signal Bus B. When Card 2 is fully inserted in Card Connector Socket 3, the electrical continuity is maintained between the card, the Card Signal Bus A and the Box Signal Bus B if the card bus switch is in the closed state. If the switch is in the open state, there is electrical discontinuity between the Box Bus Signal B and the Card Signal Bus A. Preferably, the Card Signal Bus Switch 4 should be of the type that has low on resistance without introducing propagation delay or additional ground bounce noise. Also, the switch may include a series termination resistor to reduce reflection in certain high speed applications. The prior art has several switches which can be selected for use. For example, Bus Switches QS32X2384 and QS32X2384, manufactured by QUALITY SEMICONDUCTOR, INC. are suitable candidates. The QS32X2384 includes internal 25 Ohm series termination resistors to reduce reflection noise in high speed application.

A digital signal on the conductor labeled Card Signal Bus Control F provides a control signal for activating Card Signal Bus Switch 4. The Box Signal Bus Arbitrator 5 is connected to Box Signal Bus B and, via a conductor labeled Box Signal Bus Arbitration Signals K, to Hot Plug Controller 9. The Box Signal Bus Arbitrator 5 provides access control for the Box Signal Bus B. As will be explained below, prior to any attempt to switch Card Signal Bus Switch 4 from an open or closed state, the Hot Plug Controller 9 obtains control of the box signal bus via arbitration to the Box Signal Bus Arbitrator 5. When Hot Plug Controller 9 has control of the bus, it will enable or disable Card Signal Bus Switch 4. If the Hot Plug Controller 9 does not have control of the bus, it will not activate or de-activate the Card Signal Bus Switch 4. This method of driving the bus control switch makes it less likely to cause problems in the box because, when the bus is switched, no other device in the box should be using the bus.

Still referring to FIG. 1, the Hot Plug Sub-System 16 further includes the Hot Plug Power Controller 21 that interconnects the Box Power Bus D and the Card Power Bus C. The Hot Plug Power Controller 21 regulates and monitors the voltage output from Power Source 12 and generates the Card Power Good Signal G on the line or conductor labeled Card Power Good G. The Hot Plug Power Controller 215 may be an off-the-shelf device such as HIP1011 PCI Hot Plug Controller manufactured by Harris Semiconductor.

In an alternate embodiment, the Hot Plug Power Controller 21 is fabricated from Card Power Switch 6 and Card Power Good Sensor 7. Card Power Switch 6 interconnects the Card Power Bus C and the Box Power Bus D. The line labeled Card Power Control E interconnects the Card Power Switch 6 to the Hot Plug Controller 9. As will be described subsequently, the Hot Plug Controller 9 generates card power control signals for controlling the Card Power Switch 6. The Card Power Switch 6 provides the facility for interconnecting the Card Power Bus C and the Box Power Bus D. In addition to the connection function, the Card Power Switch 6 provides over current protection so that a large in-rush of current does not flow to the card when it is hot plugged in Socket 3. To this end, the Card Power Switch 6 ramps the voltages of the Card Power Bus C at a controlled rate. Also, if a short circuit or over current condition exists on the card, the card power switch turns off the voltage. The Card Power Good Sensor 7 is connected to the Card Power Bus C and to the Hot Plug Controller 9 by a conductor labeled Card Power Good G. The Power Good Sensor 7 monitors the Card Power Bus C and when the voltage on the card stabilizes, outputs a signal which is used by the Hot Plug Controller 9.

A Card Logic Good H Conductor interconnects the Card Socket 3 to the Hot Plug Controller 9. When the logic on the card has tested good, a signal is generated on the Card Logic Good H conductor and is used by the Hot Plug Controller 9. Likewise, the line or conductor labeled Card Present I transmits a signal from the socket to the Hot Plug Controller 9 when it is determined that the card is present in the connector socket. The line labeled Card Reset J interconnects the Hot Plug Controller 9 to the Card Connector Socket 3. Prior to removing the card from the socket, the Hot Plug Controller 9 generates and transmits a card reset signal on the line labeled Card Reset J. The signal is used on the card to reset and puts the card in a state where it can be removed from the socket without any adverse effect to the circuits on the card. Finally, the Optical Switch 8 outputs a signal, on the line labeled Switch State L, to the Hot Plug Controller 9 when the cover plate 1 is rotated into the open and closed positions. It should be noted that the cover plate Tab 14 mounted to the cover plate causes a change in signal output from Optical Switch 8 when the cover plate is rotated into the open and closed positions. As stated above, the Hot Plug Controller 9 provides the necessary signals for closing or opening the Card Bus Switch 4 and the Card Power Switch 6. To this end, the Hot Plug Controller 9 monitors switch state signal on Switch State Signal line L, card present signal on Card Present Signal line I, card good signal on Card Logical Signal line H, and card power good signal on the Card Power Good Signal line G. The Hot Plug Controller 9 also communicates over Box Signal Bus Arbitration Signal line K with the Box Signal Bus Arbitrator 5. When access is granted to the Hot Plug Controller, it generates card signal bus control signals on the Card Signal Bus Control F line to drive the Card Bus Switch 4. Likewise, the Hot Plug Controller 9 generates the card power control signal on Power Control E line for controlling the Card Power Switch 6.

Figure 4:
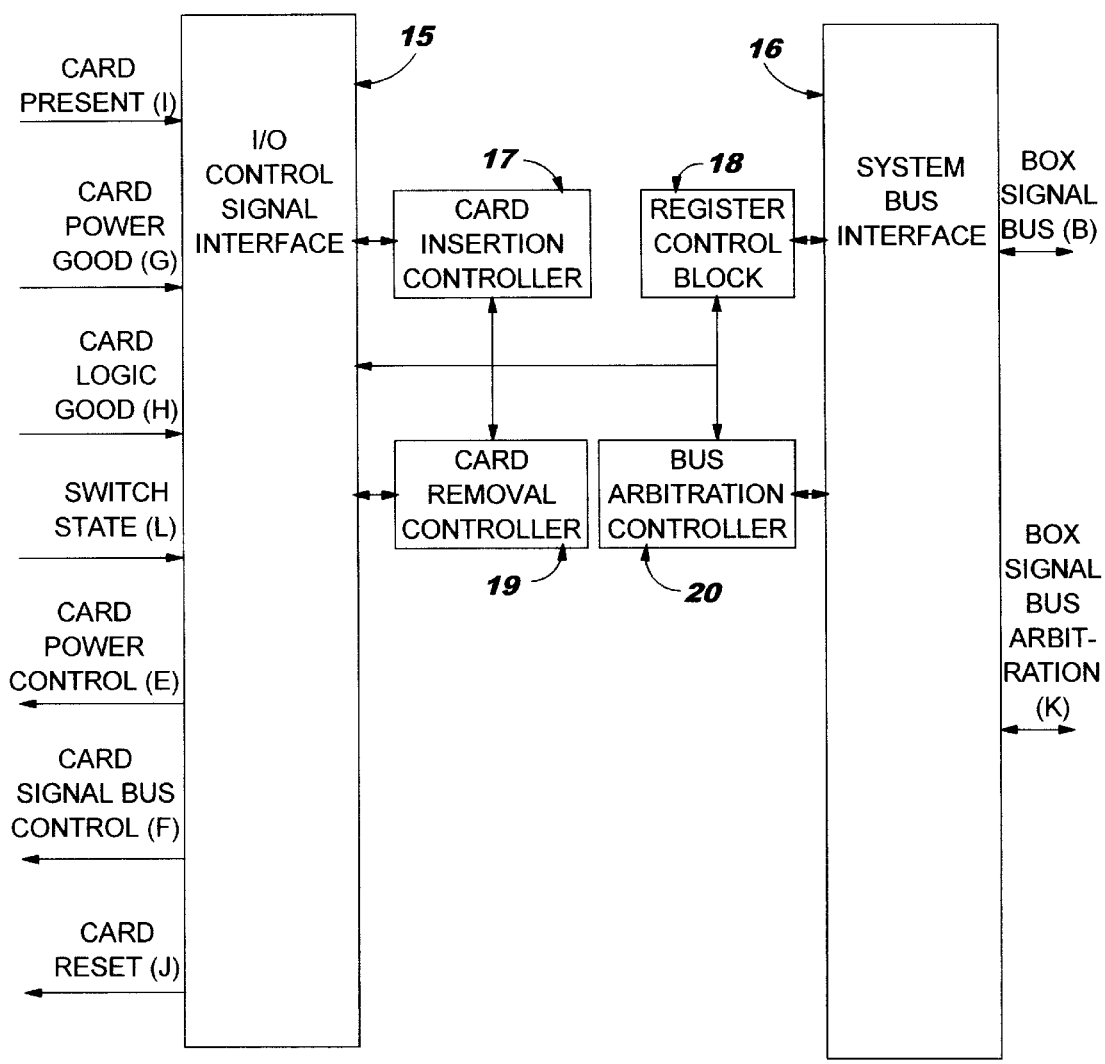
FIG. 4 shows a block diagram of the Hot Plug Controller.

Referring now to FIG. 4, a detailed block diagram for the Hot Plug Controller 9 (FIG. 1) is shown. The Hot Plug Controller includes I/O Control Signal Interface 15, System Bus Interface 16, Card Insertion Controller 17, Register Control Block 18, Card Remover Controller 19 and Bus Arbitration Controller 20. The Hot Plug Controller can be implemented in several different ways. Our implementation chooses to use a CPLD (Complex Programmable Logic Device) from Altera® for the Hot Plug Controller. However, the controller could just as easily be implemented in an FPGA (Field Programmable Gate Array) or an ASIC (Application Specific Integrated Circuit). The physical implementation does not affect the desired function.

The I/O Control Signal Interface Block 15 is responsible for providing the means by which the Card Insertion and Card Removal Controllers 17 and 19 interface to the External Hot Plug Control Signals E, F, G, H, I, J and L. This block is comprised of standard CMOS/TLL driver and receiver logic circuitry.

The System Bus Interface 16 is responsible for interfacing to the Box Signal Bus B and the associated Arbitration Signals K. This interface is comprised of a system clock and all address, data and control signals required for box signal bus access. The system bus interface provides system processor access to and control of the Hot Plug Controller through the Register Control Block 18. In addition, the System Bus Interface 16 provides the external interface required by the Bus Arbitration Controller 20.

The Bus Arbitration Controller 20 is responsible for implementing the system bus arbitration scheme. This involves requesting the bus and taking ownership of the bus using the proper method. The Bus Arbitration Controller 20 requests the bus on behalf of the Card Insertion Controller 16 or Card Removal Controller 19 and indicates bus ownership to the requesting controller when the bus has been acquired. The Bus Arbitration 20 interfaces to the Box Signal Bus Arbitration Signals K through System Bus Interface 16.

Figure 2:
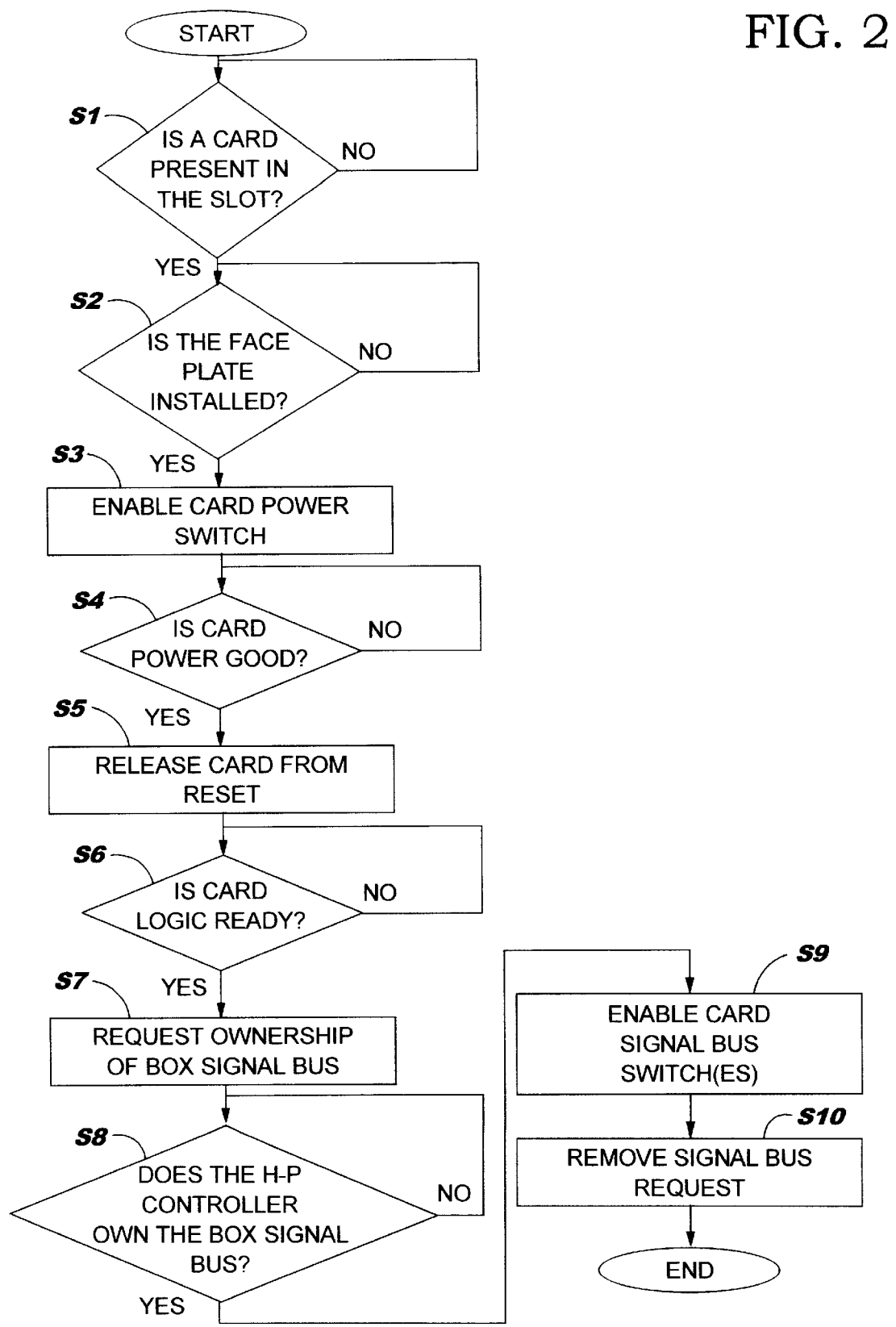
FIG. 2 shows a flowchart of the process steps used by the controller to allow removal of the card.

The Card Insertion Flowchart shown in FIG. 2 is implemented in the Card Insertion Control Block 17. Preferably, the flowchart is implemented as a state machine. Inputs to the state machine come from the I/O Control Signal Interface 15. Also, control outputs from the state machine are driven externally by the I/O Control Signal Interface 15. Card Insertion Controller 17 arbitrates for the system bus through the Bus Arbitration Controller 20. The current state may be monitored and controlled through registers in the Register Control Block 18.

Figure 3:
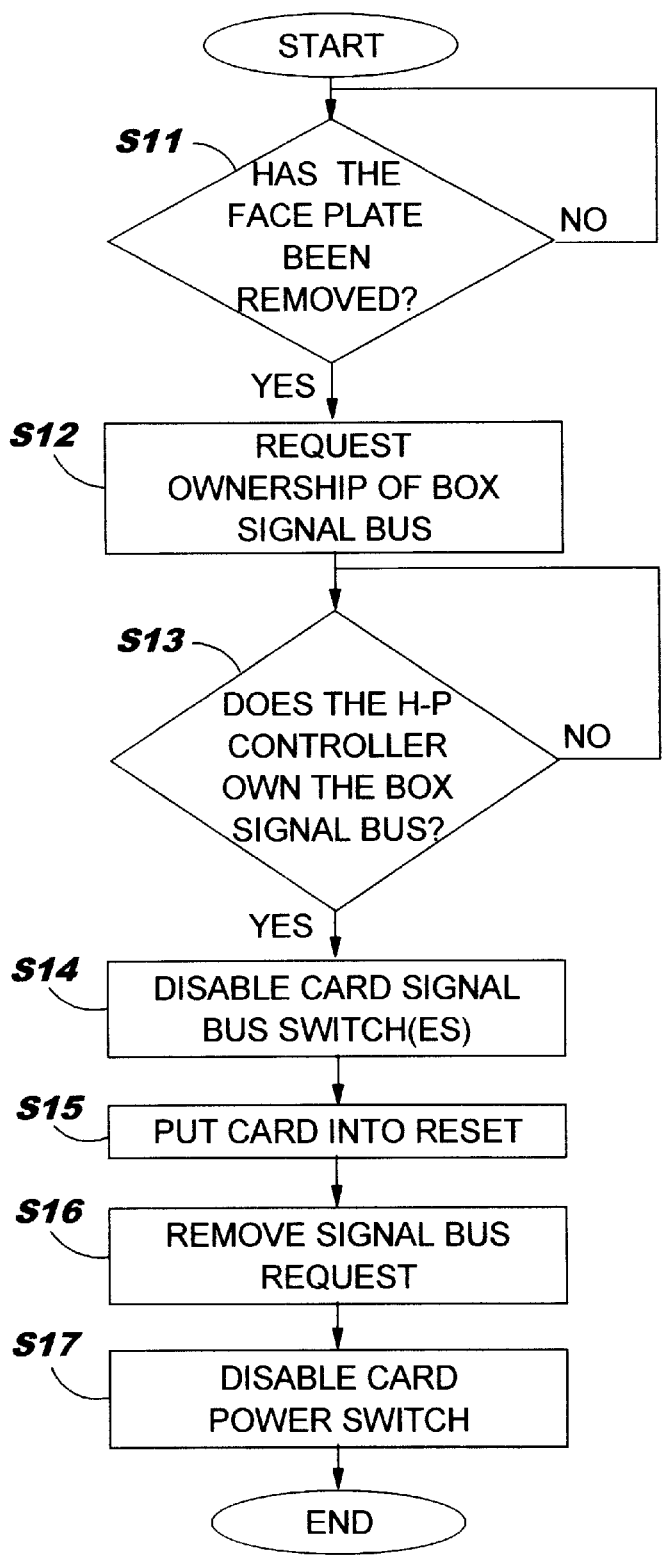
FIG. 3 shows a card insertion flowchart used by the Hot Plug Controller.

The Card Removal Control Block 19 is responsible for implementing the steps set forth in the Card Removal Flowchart shown in FIG. 3. Preferably, the flowchart is also implemented as a state machine. Inputs to the state machine come from the I/O Control Signal Interface 15. Also, control outputs from the state machine are driven externally by I/O Control Signal Interface 15. Card Removal Controller 19 arbitrates for the system bus through the Bus Arbitration Controller 20. The current state may be monitored and controlled through registers in the Register Control Block 18.

The Register Control Block 18 provides the system processor (or software) status and control of the Hot Plug Controller. This block is a grouping of registers that are accessed through the System Bus Interface 16. The registers provide status of the Hot Plug Input Signals G, H, I and L through the I/O Control Signal Interface 15. Also, the registers provide control over all Hot Plug Output Signals E, F and J through the same means. In addition, the Register Control block provides control of the Card Insertion 17 and Card Removal 19 controllers.

Referring to FIG. 1 for the moment, the control signals Card Logic Good H, Card Power Good G, Card Reset J and Card Present I will be described.

The Card Power Good G is a digital output signal that indicates that the voltage(s) on the Card Power Bus C is/are stabilized within appropriate limits. In applications where there are multiple voltages on the Card Power Bus C, the Card Power Good G signal may be a single line that logically ANDs the status of all voltages on the Card Power Bus C. The circuity to generate this signal can consist of a voltage comparator and a voltage reference set at the appropriate limit.

The Card Logic Good H is a digital output signal from the Hog Pluggable Card 2 that indicates its status to the Hot Plug Control 9. This is an optional signal that is generated by the Hot Pluggable Card and is asserted when a successful diagnostic procedure has been completed. The output can be a bit from a status register (flip/flop) or from combinatorial logic.

The Card Present I is a digital output signal that is provided by the Hot Plugged Card 2 when the card is inserted into the Card Connector Socket 3. In certain applications, it may be necessary to have multiple Card Present I signals at different locations on the Card Connector 3 to detect if the Hot Pluggable Card 2 is inserted properly. This signal is generated by hardwiring a pin of the Hot Pluggable Card's edge connector to ground that connects to the Card Present Signal I of the Card Connector Socket 3.

Finally, the Card Reset J is a digital input signal that resets the Hot Plugged Card 2. This signal is generated by the Hot Plug Control 9 and it is independent from the system reset. This allows full control of the reset sequence.

Having described the Processor Base System 10 including the Hot Plug Sub-System 16 that controls the hot plugging of a Card 2 into/from the Card Connector Socket 2, a flowchart of the process used by the Hot Plug Controller 9 to enable the card to be successfully plugged into the card connector will now be given.

FIG. 2 shows the card insertion flowchart. After the start routine, the algorithm descends into block S1 where the Hot Plug Controller tests to see if the card is inserted in the slot. This is done by monitoring the signal on Card Present I conductor. If the card is not in the slot, the algorithm loops. If the card is in the slot, the algorithm descends into block S2 where it tests to see if the cover plate is in the closed position. This is done by monitoring the Switch State L line for the switch state signal. As stated previously, the Optical Switch 8 outputs a level change on the Switch State L line when the cover plate Tab 14 moves relative to the light emitting/light receiving device. If the cover plate is not in the closed position, the algorithm loops. If it is closed, the algorithm descends into block S3 where it enables the card power switch via a card power control signal on Card Power Control line E. With the switch activated to the closed position, the Card Power Bus C is coupled to Box Power Bus D and power is provided to the card. It is assumed at this time that the card is now plugged into the connector slot.

Still referring to FIG. 2, the program then descends into block S4 where it tests to see if the card power is good. This test is done by sampling the card power good signal on Card Power Good G line. If the card power is bad, the algorithm loops. If the card power is good, the algorithm descends into block S5. In block S5, the reset signal is generated and outputted on Card Reset J line. As stated previously, the reset signal is used on the card to reset the card into an inactive or active state. The algorithm then descends into block S6 where it tests to see if the card logic is ready. This is done by sampling the signal on the Card Logic Good Signal H line. The algorithm loops if the card logic ready signal step 6 indicates that the card logic is not ready. If the card signal indicates that the card logic is ready, the algorithm (Note: If Logic Ready signal is not used, then line defaults to Active Ready State) descends into block S7 where the Hot Plug Controller requests ownership of the Box Signal Bus over the signal line labeled Bus Signal Bus Arbitration Signals K. The algorithm then descends into block S8 where it checks to see if the hot plug (H-P) controller has control of the bus. This is made possible by the Box Signal Bus Arbitrator 5 outputting a grant signal. If the grant signal is not present, the algorithm loops. If the Grant Signal is present, the algorithm descends into block S9. In block S9, the algorithm enables the Card Bus Switch 4 via signals on the line labeled Card Signal Bus Control F. The algorithm then descends into block S10 where it removes the request for use of the bus. At this point, the card is fully inserted, the voltages are in order and there is electrical continuity between the power bus of the system and the card, and the signal bus of the system and the card. The algorithm then exits via the end block.

FIG. 3 shows a flowchart of the algorithm used in the Hot Plug Controller when a card is removed from Card Socket 3. The algorithm starts at block S11 through the start block. In block S11, the program checks to see if the cover plate is in the open position. This is done by the state of the signal on the Switch State Signal L line. If the cover plate has not been lifted into the open position, the algorithm loops. If it has been lifted, the algorithm descends into block S12 where it issues a request for ownership of the Box Signal Bus. As stated previously, the request and communication for using the bus is done via the Bus Signal Bus Arbitrator 5. The algorithm then descends into block S13 where it checks to see if the Hot Plug Controller is given control of the bus. If not, the algorithm loops. If yes, the algorithm descends into block S14 where it disables the Card Signal Bus Switches 6 via the Card Power Control line E. The algorithm then descends into block S15 where it generates and outputs a reset pulse on Card Reset J line. The algorithm then descends into block S16 where it removes the request signal to the box signal bus arbitrator. The algorithm then descends into block S17 where it disables the Card Power Switch 14 by issuing signals on the Card Power Control E line and exits through the end block.

The Hot Plug Sub-System does not require operator intervention, other than closing or lifting the cover plate and inserting or removing the card. Consequently, human error, such as removing or inserting the wrong card, is mitigated.

FIGS. 5A and 5B are perspective views of the base 500 of the cover plate assembly of the present invention. Referring to these figures, base 500 in generally "L" shaped in cross section and includes hinge pin retaining clips 501–505 for receiving the hinge pins of the cover plates 1, which are described in more detail below. Each of these clips 501–505 have an opening in the front of the clip that is narrower than the diameter of the hinge pin, such that the cover plate and hinge pin must be forced into the clips 501–505 during attachment. Once the hinge pin is forced past the narrow opening, the hinge pin is retained within the clips 501–505 and can freely rotate. Two tabs 506 and 507 include, respectively, holes 506a and 507b for attaching the base 500 to the housing of a computer using fasteners, such as screws. On the rear surface of base 500, as seen in FIG. 5B, two latches 508 and 509 hold the printed circuit board (described below) to the back of base 500. Slots 510–513 receive the tabs 14 on the back of each cover plate 1.

FIG. 6 is a perspective view of the printed circuit board 600. Referring to this figure, PC board 600 includes four optical switches 601–604. The tabs 1 of the cover plates are inserted into the corresponding slot of the optical switches when the cover plates are in the "down" or "closed" position, thereby interrupting the light beam internal to the optical switch. The interruption of this light beam is then translated into a switching signal, which is used to activate the power and bus signals to the corresponding adapter card.

Figure 7A:
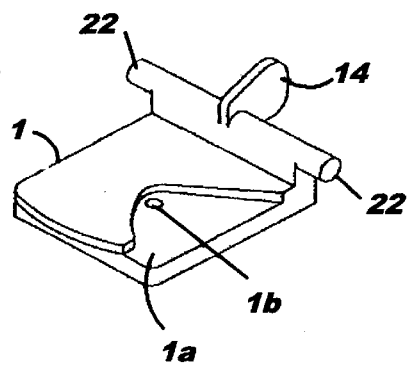
FIGS. 7A and 7B are, respectively, front and rear perspective views of the cover plate.
Figure 7B:
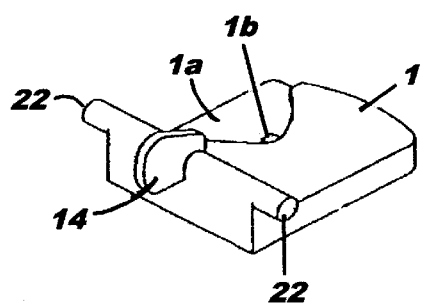

FIGS. 7A and 7B are perspective views of the cover plate 1. Referring to these figures, cover plate 1 includes a hinge pin 22 that extends out from the left and right sides of the cover plate 1. When cover plate 1 is attached to base 500, hinge pins 22 are captivated by the clips 501–505, which permit the cover plate to rotate about the hinge pins. Tab 14 extends behind cover plate 1 and, when the cover plate is attached to the base 500, the tab projects through the corresponding slot 510–513 and into the optical switch when the cover plate is rotated to the down or closed position. Rotating the cover plate up to the open position withdraws tab 14 from the slot in the optical switch 601–604. Cover plates 1 also include a recess 1a for receiving a locking clamp, which is described in more detail below with respect to FIGS. 8A and 8B. A detent 1b within the recess mates with a protuberance on the under side of the clamp, thereby helping to retain the clamp in the locked position.

Figure 8A:
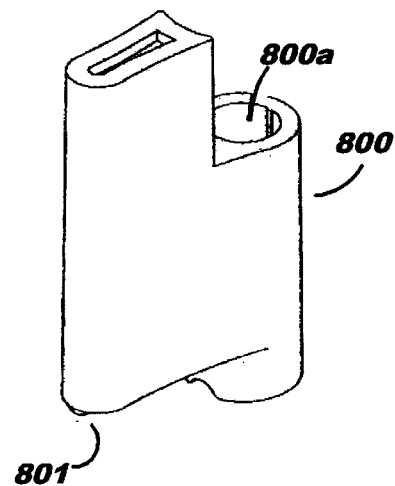
FIGS. 8A and 8B are, respectively, front and rear perspective views of the locking tab.
Figure 8B:
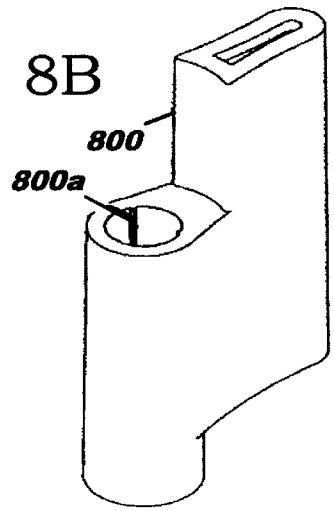

FIGS. 8A and 8B are perspectives views of one of the four locking clamps 800. Referring to these figures, each locking clamp 800 includes a hole 800a for receiving a post (not illustrated in FIG. 8). The post is inserted through hole 800a and one end of the post is attached to the computer housing, thereby permitting the locking clamp to rotate about the post. On the under side of the lock clamp 800 is a protuberance 801 that engages hole 1b of the cover plate when the locking clamp is rotated into the locked position. In the locked position, locking clamp 800 inhibits the lifting of cover plate 1. When locking clamp 800 is rotated around its mounting post and beyond the recess 1a in cover plate 1, the clamp is in the unlocked position and the cover plate can be lifted into the open position.

Figure 9:
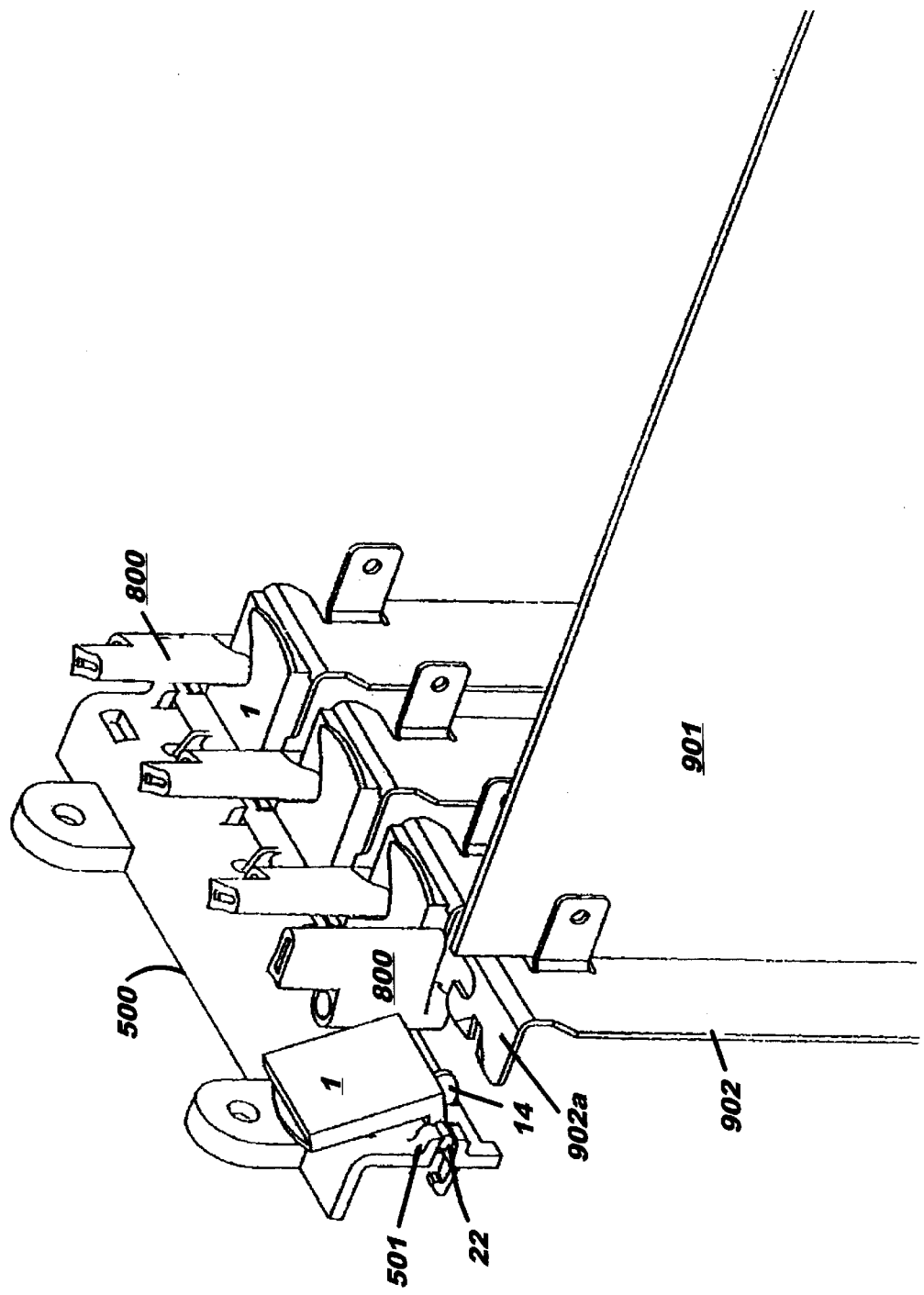
FIG. 9 is a perspective view of cover plate assembly attached to a computer housing that includes an adapter card inserted into the leftmost slot.

FIG. 9 is a perspective view of a section of the computer housing including an adapter or option card inserted into the housing. Referring to this figure, an adapter or option card 901 has been inserted into the computer housing. This adapter card includes an end bracket 902, usually made of a conducting material. As seen in FIG. 9, the left most cover plate 1 is shown in the up or open position. In this position, the adapter card 901 can be removed or inserted into the corresponding card slot. Also, in this open position, power and bus signals are removed from the slot as described above, thereby permitting the insertion or removal of the adapter card. Also as seen in FIG. 9, the right most cover plate 1 is illustrated in the down or closed position and the locking clamp 800 has been rotated into the locked position such that protuberance 801 is engaged into detent 1b to lock the clamp in position. In this close position, and if an adapter card were inserted into the corresponding slot, the adapter card could not be removed, and power and bus signals would be available to any card inserted in this slot. Furthermore, the top 902a of the conductive end bracket 902 would be firmly clamped against a corresponding bracket in the computer housing (see FIG. 10), thereby providing an excellent ground connection between the adapter card and the computer housing 10'.

Figure 10:
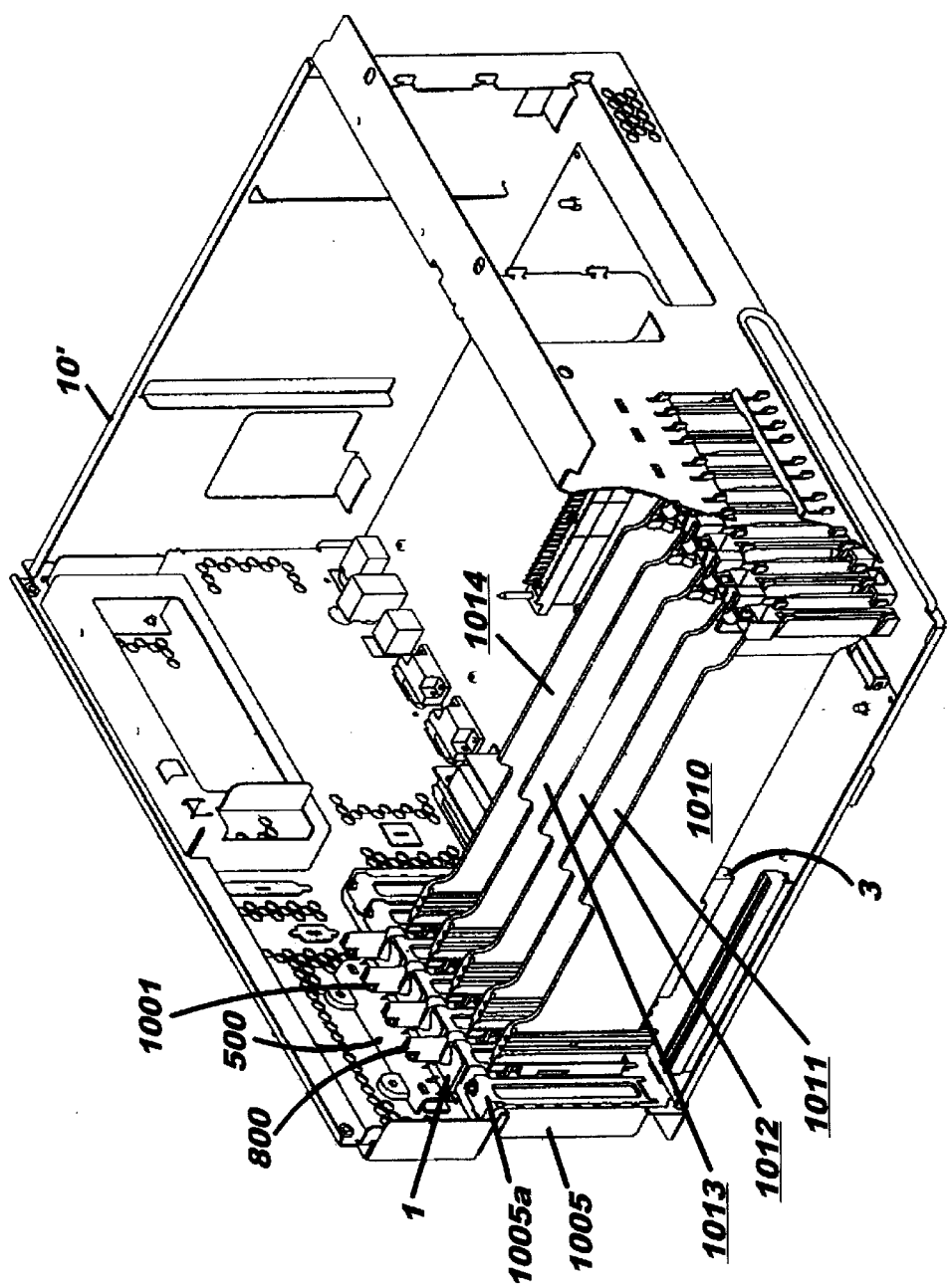
FIG. 10 is a perspective view (partially cut away) of a computer housing that includes the cover plate assembly.

FIG. 10 is a perspective view of a computer housing including the cover plate assembly of the current invention. Referring to this figure, the cover plate assembly 500 is attached to the rear wall of the computer housing 10'. A plurality of posts, e.g., 1001, are mounted to the computer housing 10' and attach the clamps 800 to the computer housing such that the clamps can be rotated about the post. In FIG. 10, each of the clamps 800 is shown in the unlocked position and each of the cover plates 1 are shown in the down or closed position. A plurality of electrically insulating dividers 1010–1014 separate each of the adapter card slots in the computer. Each of the adapter card slots includes an edge connector 3 for electrically connecting an adapter card (not illustrated in FIG. 10) to the computer system 10. As seen in FIGS. 9 and 10, a plurality of housing brackets, e.g., 1005, receive the adapter card bracket, e.g., 901 and the horizontal portion 902a of the adapter card bracket 902 is firmly clamped against the bracket 1005 when the cover plate 1 is closed over the portion 902a and the clamp 800 is rotated into the locked position over the cover plate. This clamping force provides for good electrical conduction between the adapter card bracket 902 and the housing bracket 1005, thereby providing a good ground connection for the adapter card.

To insert or "hot plug" an adapter card while power is applied to the computer, the user rotates the appropriate locking clamp to the unlocked position as illustrtated in FIG. 10. Next, the user lifts the appropriate cover plate 1 to the open or up position. Note that when the cover plate is in the down position, it physically blocks the insertion of an adapter card into the correpsonding adapter card slot. The lifting of the cover plate 1 causes the tab 14 to be removed from the correpsonding optical switch 601–604, thereby turning off the power and bus signals to the selected adapter card slot as described above. The lifting of the cover plate allows an adapter card to be physically inserted into the corresponding adapter card slot. Next, the user inserts the adapter card into the slot and then closes the cover plate 1 and rotates the locking clamp 800 into the locked position. The closing of the cover plate 1 reinserts the tab 14 into the optical switch, thereby returning power and bus signals to the slot as described above. To remove an adapter card from the slot, the user rotates the locking clamp 800 into the unlocked position and lifts the cover plate 1; thereby removing power and bus signals from the corresponding adapter card slot and permitting the adapter card to be removed.

Even though the invention has been described with reference to specific embodiments, it is possible that one skilled in the art could conceive of many variations. Notwithstanding, all such variations are included within the intended scope of the present invention as defined in the following claims.

We claim:

1. In a computer system having an adapter card slot for receiving an adapter card and a bus for electrically coupling the adapter card to the bus wherein the bus carries power and bus signals to the adapter card, a system for removing and attaching the adapter card to the bus while power is applied to the computer, said system comprising:

an optical switch:

means, coupled to said optical switch, for disconnecting and connecting power and bus signals to the adapter card slot;

a rotatable cover plate having open and closed positions wherein, in the closed position, the cover plate covers the adapter card slot physically preventing the adapter card from being inserted into slot, said rotatable cover plate including a tab, said tab being inserted into an opening in said optical switch such that power and bus signals are connected to the adapter card slot when the cover plate is in the closed position, said tab being removed from the opening in said optical switch when the cover plate is rotated into the open position such that power and bus signals are removed from the adapter card slot when the cover plate is in the open position; and a locking clamp having locked and unlocked positions, said clamp locking said cover plate in the closed position, while permitting said cover plate to be moved to the open position when said clamp is in the unlocked position.

2. An information processing system for use with an adapter card, the information processing system comprising:

a housing;

a connector for receiving an adapter card, the connector being coupled to the housing;

a cover movable coupled to the housing, the cover having a closed position wherein the cover inhibits the insertion and removal of an adapter card into and from the connector, and the cover having an open position wherein an adapter card can be inserted into and removed from the connector;

an optical switch coupled to the housing, the optical switch having first and second states, the optical switch being controlled by the cover such that the optical switch is in the first state when the cover is in the closed position, and such that the optical switch is in the second state when the cover is in the open position, wherein the cover includes a tab for controlling the optical switch, the tab being inserted into and removed from an opening in the optical switch as the cover is moved between the open and closed positions;

a power source for supplying electrical power to the connector, the power source being controlled by the optical switch such that electrical power from the power source to the connector is Switched ON when the optical switch is in the first state, and such that electrical power from the power source to the connector is switched OFF when the optical switch is in the second state; and a locking clamp having locked and unlocked positions and being movable coupled to the housing, the locking clamp locking the cover in the closed position when the locking clamp is in the locked position, and the locking clamp permitting the cover to be moved to the open position when the locking clamp is in the unlocked position.

3. An information processing system for use with an adapter card, the information processing system comprising:

a housing;

a connector for receiving an adapter card, the connector being coupled to the housing;

a cover movable coupled to the housing, the cover having a closed position wherein the cover inhibits the insertion and removal of an adapter card into and from the connector, and the cover having an open position wherein an adapter card can be inserted into and removed from the connector;

an optical switch coupled to the housing, the optical switch having first and second states, the optical switch being controlled by the cover such that the optical switch is in the first state when the cover is in the closed position, and such that the optical switch is in the second state when the cover is in the open position;

a power source for supplying electrical power to the connector, the power source being controlled by the optical switch such that electrical power from the power source to the connector is Switched ON when the optical switch is in the first state, and such that electrical power from the power source to the connector is switched OFF when the optical switch is in the second state; and a locking clamp having locked and unlocked positions and being movable coupled to the housing, the locking clamp locking the cover in the closed position when the locking clamp is in the locked position, and the locking clamp permitting the cover to be moved to the open position when the locking clamp is in the unlocked position.

* * * * *